(12) United States Patent  
Figueiredo

(10) Patent No.: US 11,745,895 B2  
(45) Date of Patent: Sep. 5, 2023

(54) AIRCRAFT SERVICING PANEL

(71) Applicant: BOMBARDIER INC., Dorval (CA)

(72) Inventor: Erol Figueiredo, Dollard-des-Ormeaux (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 16/956,140

(22) PCT Filed: Dec. 17, 2018

(86) PCT No.: PCT/CA2018/051609  
§ 371 (c)(1),  
(2) Date: Jun. 19, 2020

(87) PCT Pub. No.: WO2019/119118  
PCT Pub. Date: Jun. 27, 2019

(65) Prior Publication Data  
US 2020/0324911 A1    Oct. 15, 2020

Related U.S. Application Data

(60) Provisional application No. 62/608,146, filed on Dec. 20, 2017.

(51) Int. Cl.
```
G06F 3/048      (2013.01)
B64D 45/00      (2006.01)
B64D 43/00      (2006.01)
G06F 3/0488     (2022.01)
```
(52) U.S. Cl.  
CPC ............ *B64D 45/00* (2013.01); *B64D 43/00* (2013.01); *G06F 3/0488* (2013.01); *B64D 2045/0085* (2013.01)

(58) Field of Classification Search  
CPC .................. B64D 45/00; B64D 43/00; B64D 2045/0085; G06F 3/0488; B64F 5/40; B64F 5/60  
See application file for complete search history.

(56) References Cited

U.S. PATENT DOCUMENTS

```
9,324,248  B2     4/2016   Garrettson
9,797,744  B2    10/2017   Bethel
2003/0116679 A1*  6/2003   Susko ............... B64D 37/32
                                                      244/135 R
2004/0162651 A1   8/2004   Halm et al.
```
(Continued)

FOREIGN PATENT DOCUMENTS

```
GB      2128569 A     5/1984
GB      2349020 A    10/2000
```

OTHER PUBLICATIONS

International Searching Authority, PCT international Search Report and Written Opinion dated Mar. 21, 2019 re: International Application No. PCT/CA2018/051609.

*Primary Examiner* — Aleksey Olshannikov  
(74) *Attorney, Agent, or Firm* — Norton Rose Fulbright Canada LLP

(57) ABSTRACT

A servicing panel of an aircraft accessible from an exterior of the aircraft is disclosed. The servicing panel comprises an electronic display device having a display area viewable from the exterior of the aircraft. The electronic display device is operatively connected to display information relating to one or more systems of the aircraft on the display area.

15 Claims, 5 Drawing Sheets

(56) References Cited

U.S. PATENT DOCUMENTS

| | | |
|---|---|---|
| 2004/0186634 A1 | 9/2004 | Lucky et al. |
| 2005/0145245 A1* | 7/2005 | Jordan ................... A62B 27/00 |
| | | 128/202.11 |
| 2007/0051852 A1 | 3/2007 | McCoskey et al. |
| 2009/0113494 A1* | 4/2009 | Weidel ............... B64D 45/0053 |
| | | 725/76 |
| 2016/0068280 A1 | 3/2016 | Buehler et al. |
| 2017/0113813 A1* | 4/2017 | Heuer .................... B64D 25/14 |
| 2017/0302888 A1 | 10/2017 | Mehrholz et al. |
| 2018/0176347 A1* | 6/2018 | Jeon ........................ G06F 3/044 |

* cited by examiner

AIRCRAFT SERVICING PANEL

CROSS-REFERENCE TO RELATED APPLICATION(S)

This application is a national phase application under 35 U.S.C. 371 of International Patent Application No. PCT/CA2018/051609 filed on Dec. 17, 2018, which claims priority from U.S. Provisional Patent Application Ser. No. 62/608,146 filed on Dec. 20, 2017, the entire content of which is incorporated herein by reference.

TECHNICAL FIELD

The disclosure relates generally to aircraft, and more particularly to aircraft servicing panels accessible from an exterior of an aircraft.

BACKGROUND

An aircraft typically has several servicing panels disposed at different locations on the aircraft and accessible from the exterior of the aircraft. Servicing panels are typically used by the ground crew to service or to verify the status of different systems of the aircraft. Existing servicing panels can have a cluttered arrangement of mechanical switches and indicators dedicated to specific functions and also have limited indication capabilities. Improvement is desirable.

SUMMARY

In one aspect, the disclosure describes a servicing panel of an aircraft. The servicing panel comprises:

an electronic display device having a display area viewable from the exterior of the aircraft, the electronic display device being operatively connected to display information relating to a system of the aircraft on the display area; and a servicing port associated with the system.

The servicing panel may comprise one or more user input devices associated with the electronic display device and accessible from the exterior of the aircraft.

The one or more user input devices may comprise a tactile button.

The one or more user input devices may comprise a touch-sensitive region of the display area.

The one or more user input devices may comprise a touch-sensitive region of the display area and a tactile button.

The one or more user input devices may be configured to selectively cause a change in the information displayed in the display area based on user input.

The servicing panel may comprise a door movable between a closed position covering the display area of the electronic display device and an open position where the display area is uncovered.

The servicing panel may comprise a switch actuatable by movement of the door. The switch may cause activation of the electronic display device when the door is open and deactivation of the electronic display device when the door is closed.

The switch may be operatively disposed between a power source and the electronic display device. The switch may be operatively disposed between the power source and a sensor of the system of the aircraft.

The servicing port may comprise an electric connector. The switch may be operatively disposed between the electric connector and the electronic display device.

The switch may be operatively disposed between the electric connector and a sensor of the system of the aircraft to permit interrogation of the sensor using a power source external to the aircraft when the aircraft is powered down.

The servicing port may comprise an electric connector.

The servicing port may comprise a fluid transfer port.

The system may comprise an oxygen tank.

The electronic display device may be operatively connected to receive a signal indicative of a pressure inside the oxygen tank via an electric connection.

The electronic display device may be operatively and wirelessly connected to the system of the aircraft.

The servicing panel may comprise a headphone jack.

The electronic display device may be operatively connected to display information relating to a plurality of systems of the aircraft on the display area.

In another aspect, the disclosure describes a servicing panel of an aircraft accessible from an exterior of the aircraft. The servicing panel comprises:

an electronic display device having a display area viewable from the exterior of the aircraft, the electronic display device being operatively connected to display information relating to a system of the aircraft on the display area; and a door movable between a closed position covering the display area of the electronic display device and an open position where the display area is uncovered.

The servicing panel may comprise one or more user input devices for receiving user input.

The one or more user input devices may comprise a tactile button.

The one or more user input devices may comprise a touch-sensitive region of the display area.

The system may comprise an oxygen tank.

The electronic display device may be operatively connected to receive a signal indicative of a pressure inside the oxygen tank via an electric connection.

The servicing panel may comprise a switch actuatable by movement of the door. The switch may cause activation of the electronic display device when the door is open and deactivation of the electronic display device when the door is closed.

The switch may be operatively disposed between a power source and the electronic display device. The switch may be operatively disposed between the power source and a sensor of the system of the aircraft.

The servicing port may comprise an electric connector. The switch may be operatively disposed between the electric connector and the electronic display device.

The switch may be operatively disposed between the electric connector and a sensor of the system of the aircraft to permit interrogation of the sensor using a power source external to the aircraft when the aircraft is powered down.

The servicing panel may comprise a servicing port associated with the system.

The electronic display device may be operatively connected to display information relating to a plurality of systems of the aircraft on the display area.

Embodiments can include combinations of the above features.

In another aspect, the disclosure describes an aircraft comprising:

a first servicing panel disposed at a first location on the aircraft and accessible from an exterior of the aircraft, the first servicing panel comprising a first electronic display device having a first display area viewable from the exterior of the aircraft, the first electronic display device being operatively connected to display information relating to one or more systems of the aircraft on the first display area; and a second servicing panel disposed at a second location on the aircraft and accessible from the exterior of the aircraft, the second servicing panel comprising a second electronic display device having a second display area viewable from the exterior of the aircraft, the second electronic display device being operatively connected to display some of the same information relating to the one or more systems of the aircraft on the second display area.

Any one of the first and second servicing panels may comprise one or more user input devices accessible from the exterior of the aircraft and operatively connected to the respective electronic display device.

The one or more user input devices may comprise a tactile button.

The one or more user input devices may comprise a touch-sensitive region of the respective display area.

The one or more user input devices may be configured to selectively cause a change in the information displayed in the respective display area.

Any one of the first and second servicing panels may comprise a servicing port associated with one of the one or more systems.

The first and second servicing panels may each comprise a door movable between a closed position covering the respective display area and an open position where the respective display area is uncovered.

The first and second electronic display devices may both be operatively connected to display information relating to a same system of the aircraft.

The first and second electronic display devices may both be operatively connected to display a tire pressure.

Each of the first and second servicing panels may comprise a controller in data communication with a network of the aircraft.

Embodiments can include combinations of the above features.

In a further aspect, the disclosure describes an aircraft comprising:

an electronic display device having a display area viewable from the exterior of the aircraft, the electronic display device being operatively connected to display information relating to a system of the aircraft on the display area; and one or more user input devices associated with the electronic display device and accessible from the exterior of the aircraft.

The one or more user input devices may comprise a tactile button.

The one or more user input devices may comprise a touch-sensitive region of the display area.

The one or more user input devices may be configured to selectively cause a change in the information displayed in the display area based on user input.

Embodiments can include combinations of the above features.

In a further aspect, the disclosure describes an aircraft comprising one or more servicing panels as disclosed herein.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure relates to aircraft servicing panels accessible from the exterior of aircraft. A servicing panel disclosed herein comprises one or more electronic display devices accessible from the exterior of the aircraft and operatively connected to display information relating to one or more systems of the aircraft. In various embodiments, the servicing panel disclosed herein may reduce or eliminate the need for some traditional function-specific mechanical gauges, switches and may provide a less cluttered arrangement compared to traditional aircraft servicing panels. In some embodiments, the servicing panel disclosed herein may be configured to flexibly and selectively display information relating to more than one aircraft system and can potentially eliminate the need for having individual servicing panels each dedicated to a single aircraft system or the need for portable hand held equipment. The use of servicing panels as disclosed herein may facilitate the integration of such servicing panels with systems of aircraft and may also facilitate aircraft servicing and maintenance.

In some situations, the use of an electronic display device may facilitate the use of common hardware components between different servicing panels. Instead of using function-specific mechanical switches and indicators, the electronic display device may serve as a multi-function display which may be cooperatively used with one or more multi-function user-input devices.

The servicing panel disclosed herein can be used in conjunction with an oxygen system of the aircraft where the electronic display device is operatively connected to one or more (e.g., pressure) sensors associated with an oxygen system via an electrical (or wireless) connection so that information relating to the oxygen system may be digitally displayed on the electronic display device. The use of the electronic display device and such sensor(s) may eliminate the need for a traditional arrangement including a relatively fragile capillary tube and "steam" gauge where such arrangement typically requires the use of a correction table to compensate for temperature-related variations in pressure readings.

Aspects of various embodiments are described through reference to the drawings.

Figure 1:
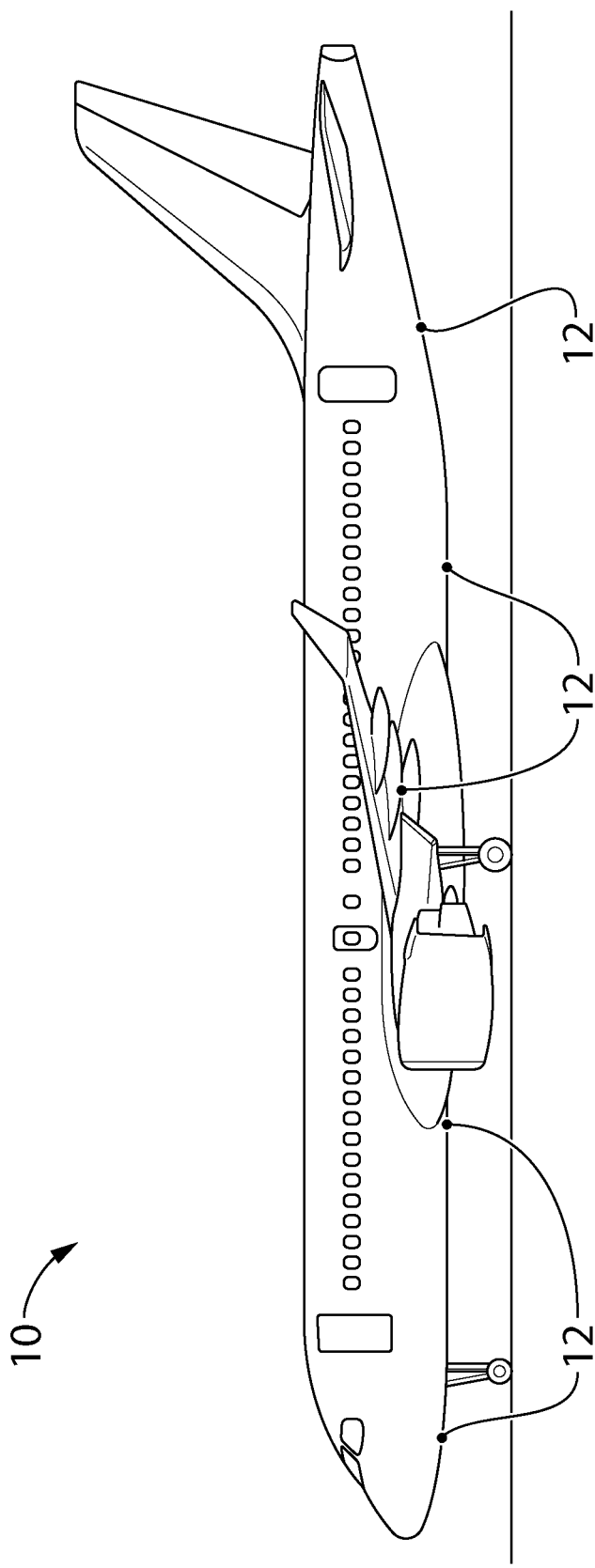
FIG. 1 is a side elevation view of an exemplary aircraft comprising one or more servicing panels as disclosed herein.

FIG. 1 is a side elevation view of an exemplary aircraft 10 comprising one or more servicing panels 12 as disclosed herein. Aircraft 10 may be any suitable aircraft such as corporate, private, commercial or any other type of aircraft. For example, aircraft 10 may be a narrow-body, twin engine jet airliner. Aircraft 10 may be a fixed wing or a rotary wing aircraft.

Aircraft 10 may comprise a plurality of servicing panels 12 as disclosed herein. Servicing panels 12 may be accessible to maintenance personnel or ground crew from the exterior of aircraft 10. Each servicing panel 12 may be associated with one or more systems of aircraft 10 and may be disposed on aircraft 10 at respective locations convenient for servicing such system(s). Non-limiting examples of the types of servicing panels 12 include: an oxygen system servicing panel, a hydraulic system servicing panel, electric power receptacle, aircraft grounding panel, tire pressure monitoring panel, fuelling panel, potable water panel and toilet servicing panel. It is understood that aspects of the present disclosure are applicable to various types of servicing panels 12 and are not limited to the specific examples provided herein.

Figure 2:
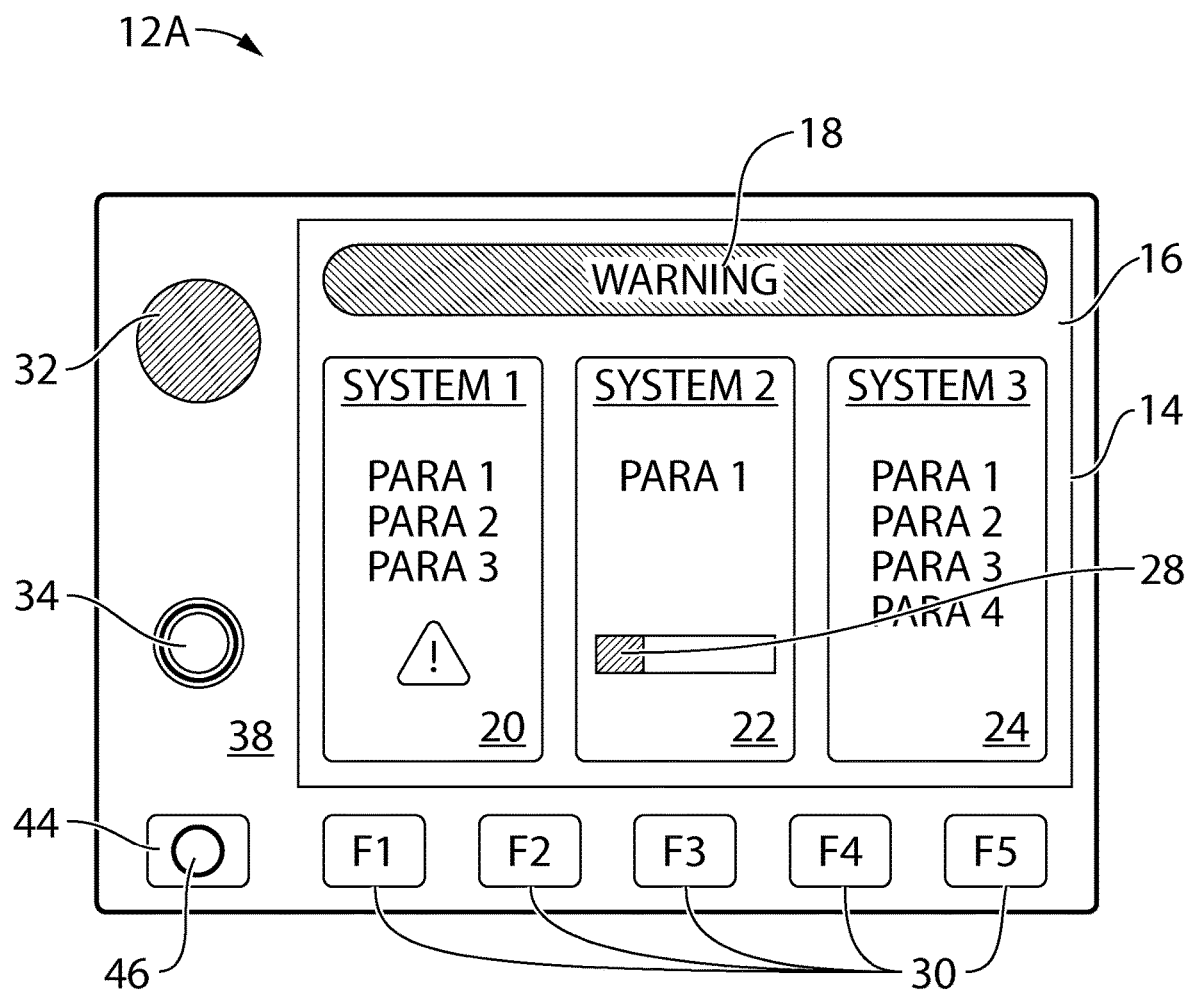
FIG. 2 is a schematic representation of an exemplary servicing panel of the aircraft of FIG. 1.

FIG. 2 is a schematic representation of a first exemplary servicing panel 12A of aircraft 10 accessible from the exterior of aircraft 10 by airline ground crew for example. Servicing panel 12 may comprise one or more electronic display devices 14 (referred hereinafter in the singular) incorporated therein. Electronic display device 14 may be an electronic visual display/screen suitable for the presentation of images, text, and/or video received electronically. Non-limiting examples of the types of electronic display device 14 which may be suitable include: a light-emitting diode (LED) display device, a liquid crystal display (LCD) device, an organic light-emitting diode (OLED) display device and cathode ray tube (CRT) display device. Display device 14 may be relatively rugged and configured to withstand challenging environments. In some embodiments, display device 14 may be water resistant or substantially waterproof, resistant to the exterior environment, and have display area 16 that has glare protection and that is sunlight-readable. In other words, electronic display device 14 may be considered an "all-weather" product.

Electronic display device 14 may be operatively connected to display information relating to one or more systems of aircraft 10 on display area 16, which may be viewable from the exterior of aircraft 10. Electronic display device 14 may be configured to variably display information in display area 16 based on electronic information received. In some embodiments, electronic display device 14 may be configured to selectively display information in display area 16 based on input from the ground crew for example.

FIG. 2 shows an exemplary format of display area 16 configured for displaying information relating to three different systems (e.g., SYSTEMS 1-3) of aircraft 10. It is understood that in various embodiments, display area 16 may be formatted to display information relating to one or more systems of aircraft 10. In the exemplary embodiment shown, display area 16 comprises different regions 18, 20, 22, 24 for displaying information relating to different systems or information of different categories. For example, region 18 may be a status bar used for displaying a general status message indicative of the status of one or more of the three systems associated with this particular servicing panel 12A. Region 18 may be used to display a message intended to attract the ground crew's attention upon accessing servicing panel 12A and also indicate to the ground crew that one or more of the three systems requires attention. For example, region 18 may be used to display a general warning message.

Regions 20, 22 and 24 may each display more specific (e.g., digital) information that is associated with a respective system of aircraft 10. Region 20 may, for example, be associated with SYSTEM 1 (e.g., oxygen system) and may display one or more parameters (e.g., PARA 1, PARA 2 and PARA 3) indicative of the status of SYSYEM 1. Region 20 may include text and/or graphics-based information including a visual indication 26 indicating that SYSTEM 1 requires attention from the ground crew. In the case of an oxygen system of aircraft 10, the parameters may be one or more pressures associated with one or more oxygen tanks onboard aircraft 10. Indication 26 may be indicative of an insufficient quantity (e.g., pressure) of oxygen inside one or more oxygen tanks for example.

Region 22 may, for example, be associated with SYSTEM 2 (e.g., batteries) and may display one or more parameters (e.g., PARA 1) indicative of the status of SYSTEM 2. Region 22 may also include text and/or graphics-based information including a gauge or progress bar 28 indicating a state of the health of SYSTEM 2 such as the charge level of one or more batteries onboard aircraft 10 for example so that the ground crew can determine whether repair or service is required on SYSTEM 2.

Region 24 may, for example, be associated with SYSTEM 3 (e.g., tires) and may display one or more parameters (e.g., PARA 1, PARA 2, PARA 3 and PARA 4) indicative of the status of SYSTEM 3. Region 24 may also include text and/or graphics-based information indicating a state of the health of System 3 such as pressures inside the tires of aircraft 10 for example so that the ground crew can determine whether repair or service is required on SYSTEM 3.

Servicing panel 12A may be interactive and hence be configured to receive input from the ground crew. In various embodiments, servicing panel 12A can comprise one or more user input devices for receiving input from the ground crew from the exterior of aircraft 10. In some embodiments, the one or more user input devices can comprise one or more touch-sensitive regions of display area 16 in the case where electronic display device 14 is a touchscreen display for example. In some embodiments, the one or more user input devices can comprise one or more tactile buttons 30 such as function keys labelled F1-F5 in FIG. 2. Tactile buttons 30 may be tactile electromechanical switches that are actuatable (e.g., by pressing) for receiving input from the ground crew. In various embodiments, tactile buttons 30 may be physically integrated with electronic display device 14 in a common housing or unit, or, may be installed separately from electronic display device 14 while still being functionally integrated with electronic display device 14. Tactile buttons 30 maybe arranged as a suitable keypad for example. In some embodiments, the one or more user input devices can comprise a combination of one or more tactile buttons 30 and one or more touch-sensitive regions of display area 16.

The one or more user input devices may be operatively configured to permit: interaction with (e.g., interrogate) the one or more systems associated with servicing panel 12A; communication with a flight deck of aircraft 10; and/or acknowledgement or clearing of a warning or fault message associated with the one or more systems after having taken a suitable remedial action to address a warning or fault for example. In some embodiments, the one or more user input devices can be operatively coupled to respond to the information displayed in display area 16, to selectively alter the display format of display area 16 and/or selectively alter the information displayed in display area 16. In some embodiments, the one or more user input devices can be configured to selectively change to which system the information displayed in display area 16 relates. For example, the user input device(s) can be configured to change the number of display regions to be displayed in display area 16 and also change the systems of aircraft 10 to be represented in display area 16. Accordingly, instead of being function-specific, user input device(s) may be multi-functional where the function(s) of user input device(s) may be context-specific and depend on the information displayed in display area 16.

In some embodiments, one servicing panel 12A as disclosed herein may potentially be associated with multiple systems of aircraft 10. Therefore, instead of having a traditional servicing panel dedicated to each applicable system of aircraft 10, fewer servicing panels 12A may be required in some situations for the same number of systems of aircraft 10.

In some embodiments, servicing panel 12A can comprise one or more servicing ports 32 associated with the systems of servicing panel 12A. Such servicing port(s) 32 may include one or more fluid transfer ports to permit a fluid (e.g., oxygen, fuel, water, liquid waste) to be transferred into or out of aircraft 10. Servicing port(s) 32 may include one or more electric connectors for example. Servicing port(s) 32 may be disposed adjacent to electronic display device 14 within servicing panel 12A.

In some embodiments, servicing panel 12A can include headphone jack 34 operatively connected to the flight deck of aircraft 10 to permit voice communication between the ground crew and the flight crew of aircraft 10 for example.

Figure 3:
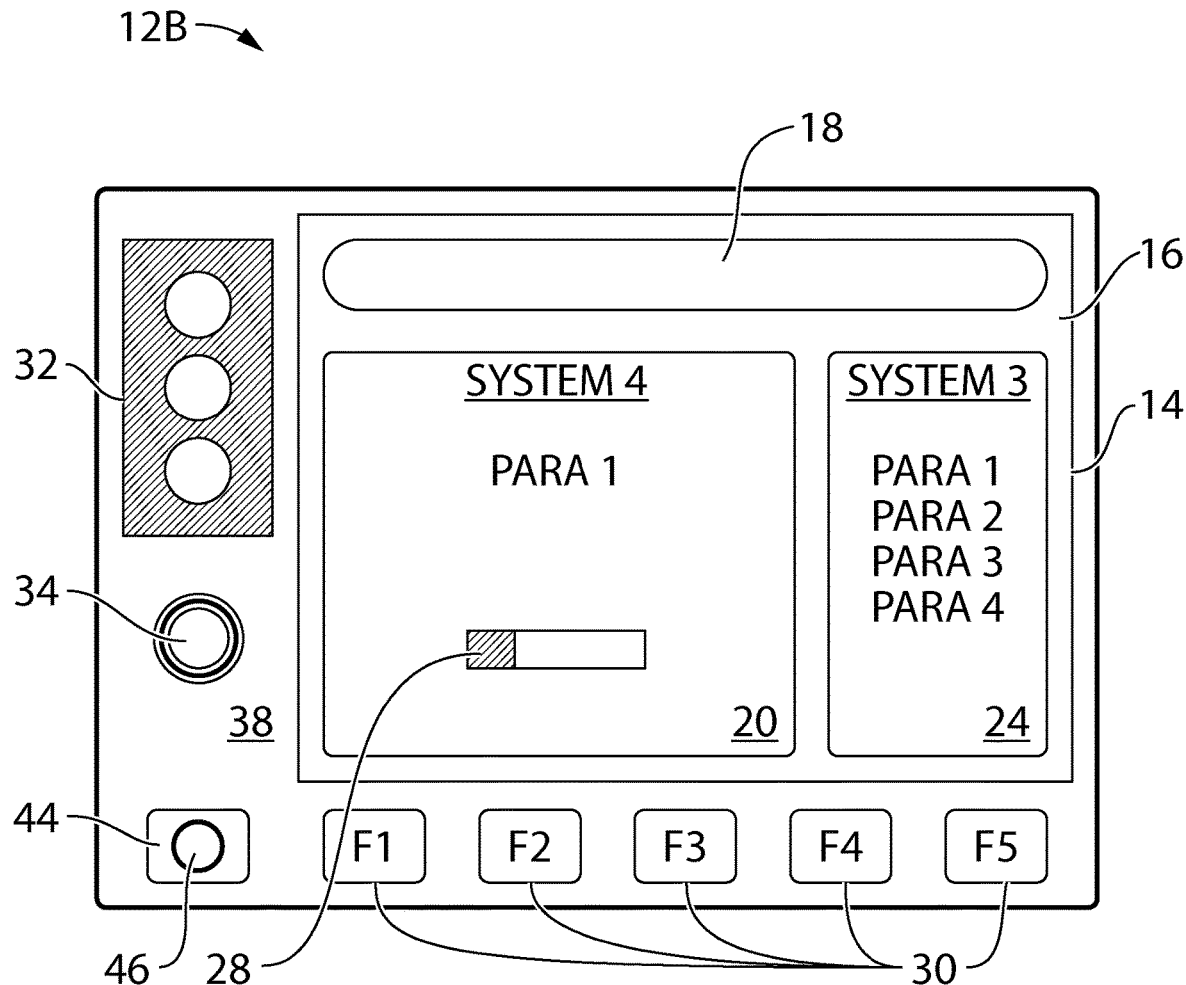
FIG. 3 is a schematic representation of another exemplary servicing panel of the aircraft of FIG. 1.

FIG. 3 is a schematic representation of another exemplary servicing panel 12B of aircraft 10. Servicing panel 12B may be mounted to aircraft 10 at a location that is different than servicing panel 12A but that is still accessible from the exterior of aircraft 10. For example, servicing panel 12A may be mounted in a forward fuselage portion of aircraft 10 and servicing panel 12B may be mounted in mid or aft fuselage portion of aircraft 10. Servicing panel 12B is shown to have a different type of servicing port 32 than that of servicing panel 12A shown in FIG. 2. In some embodiments, other than the type of servicing port 32, servicing panel 12B may have similar or identical hardware component as servicing panel 12A of FIG. 2 to simplify the design, integration and installation of servicing panels 12.

FIG. 3 shows an exemplary format of display area 16 configured for displaying information relating to two different systems (e.g., SYSTEMS 3 and 4) of aircraft 10 where a larger display region 20 is displayed and display region 24 remains shown. In contrast with servicing panel 12A, display region 20 of servicing panel 12B displays information relating to SYSTEM 4 and display region 24 still displays information relating to SYSTEM 3. In some embodiments, each servicing panel 12 may be associate with its own dedicated aircraft system(s) where each electronic display device 14 displays information relating to only specific aircraft system(s) dedicated to that particular servicing panel 12. Alternatively, servicing panels 12 may be flexibly configured so that at least some common information may be accessible via electronic display devices 14 of different servicing panels 12. For example, SYSTEM 3 may be a tire pressure monitoring system and the same information relating to SYSTEM 3 may be available via two or more servicing panels 12 of aircraft 10 for convenience to the ground crew. In some embodiments, the type of information displayed in display area 16 may be predetermined and automatically displayed in display area 16. Alternatively, the type of information displayed in display area 16 may be selected by the ground crew via user input device(s).

Figure 4:
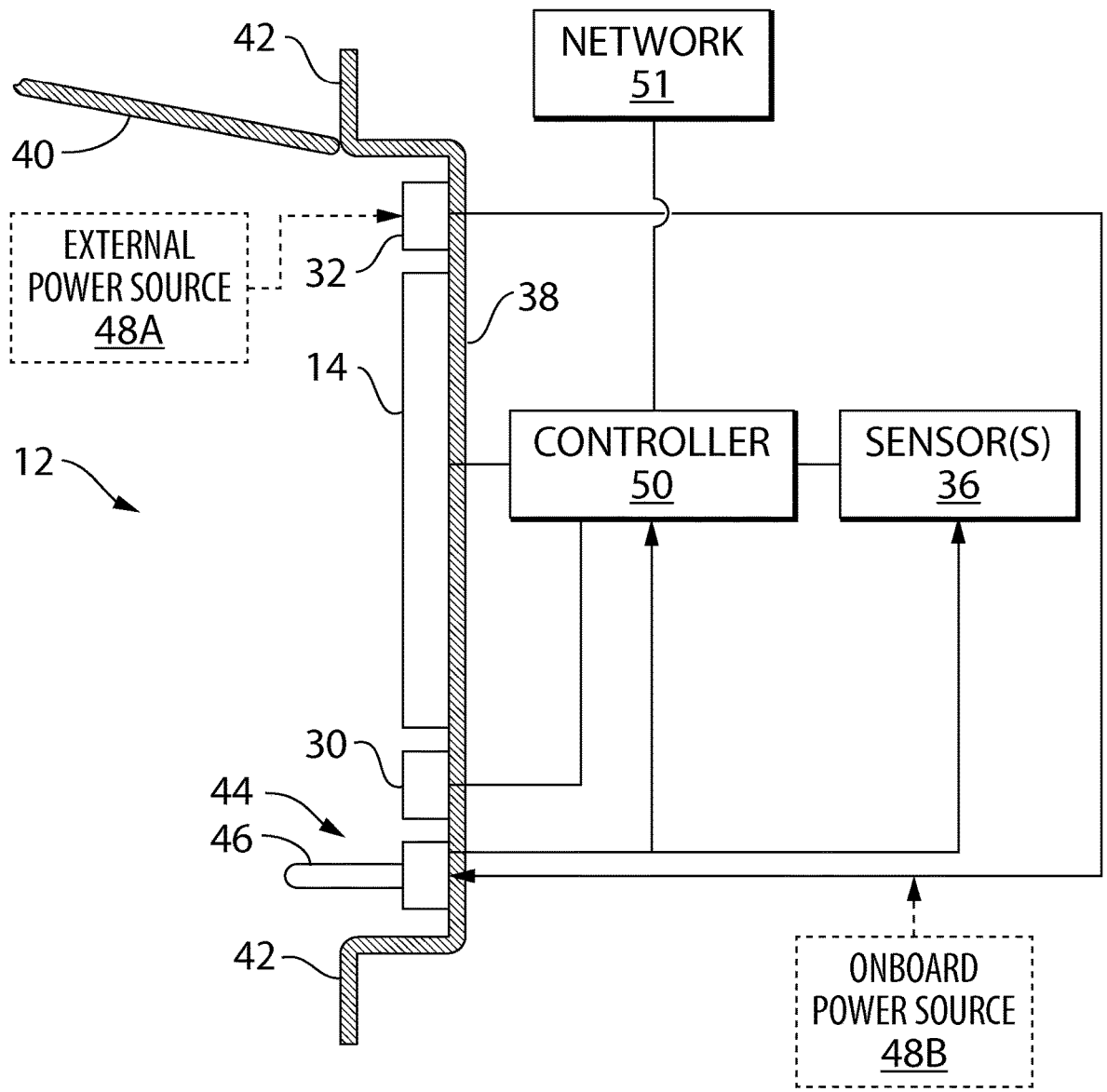
FIG. 4 is a schematic representation of a side elevation view of a servicing panel being operatively connected to one or more sensors of systems of the aircraft of FIG. 1.

FIG. 4 is a schematic representation of a side elevation view of an exemplary servicing panel 12 being operatively connected to one or more sensors 36 associated with one or more systems of aircraft 10. Headphone jack 34 has been omitted from FIG. 4 for clarity. In some embodiments, electronic display device 14, tactile buttons 30 and servicing port 32 may be attached to a common structure of servicing panel 12 such as support panel 38.

Servicing panel 12 may be accessible from the exterior of aircraft 10 via an optional door 40. The components of servicing panel 12 may be disposed inside a cavity that is recessed in an outer skin 42 of aircraft 10 so that door 40 may be substantially flush with skin 42 and optionally seal the cavity when in the closed position to avoid producing any significant aerodynamic drag penalty. In some embodiments, door 40 may be pivotally movable via one or more hinges and may be securable in its closed position via one or more suitable latches. Door 40 may be movable between a closed position covering display area 16 of electronic display device 14 and an open position as shown in FIG. 4 where display area 16 is uncovered and viewable from the exterior of aircraft 10. In some embodiments, door 40 may cover all of the components of servicing panel 12.

In some embodiments, servicing panel 12 may comprise an electric switch 44 actuatable by the movement of door 40. Switch 44 may be mounted to support panel 38 and comprise a movable contact member 46 (e.g., plunger) configured to interfere with the closing of door 40 and cause actuation of switch 44. Switch 44 may be a normally-closed switch that is biased toward its closed position and that is caused to move to its open position when door 40 is closed. Switch 44 may be operatively connected to cause activation of electronic display device 14 when door 40 is open and deactivation of electronic display device 14 when door 40 is closed. Accordingly, electronic display device 14 may be activated as needed when accessed by the ground crew from the exterior of aircraft 10.

In some embodiments, switch 44 may be operatively disposed between electric power source 48A or 48B and electronic display device 14 so that electric power may be supplied to electronic display device 14 only as needed when servicing panel 12 is accessed by opening door 40 for example. Power source 48B may be an onboard power source such as one or more batteries or a suitable (e.g., direct current) power supply bus of aircraft 10. Alternatively, power source 48A may be (e.g., derived from) an external power source that may be electrically connected to servicing panel 12 via servicing port 32 or otherwise. Accordingly, switch 44 may be operatively disposed between the external power source (e.g., service port 32) and electronic display device 14.

In some embodiments, switch 44 may be operatively disposed between power source 48A or 48B and one or more sensors 36 associated with one or more systems of aircraft 10. This may permit the activation of electronic display device 14 and the interrogation of sensor(s) 36 on an as-needed basis using the same power source 48A or 48B when servicing panel 12 is accessed. In some embodiments, switch 44 may be operatively disposed between electric connector of servicing port 32 and one or more sensors 36 of the system(s) of aircraft 10 to permit interrogation of sensor(s) 36 using external power source 48A when aircraft 10 is powered down for example.

Electronic display device 14 may be operatively connected to controller 50. Electronic display device 14 may be operatively connected to the user input devices (e.g., tactile buttons 30) and also to sensor(s) 36 via controller 50. Electronic display device 14 may be operatively connected to power source 48A and/or 48B via controller 50. In some embodiments, controller 50 may be configured to control the operation of electronic display device 14 based on user input received and also based on signal(s) received via sensor(s) 36. Controller 50 may be configured to carry out signal processing or apply any required corrections, conversions, compensations of sensed values based on signals received from sensor(s) 36 and command electronic display device 14 to display information that is relevant to the ground crew. In the case where the system associated with servicing panel 12 is an oxygen tank for example, any temperature-related compensation that is typically required on a pressure value obtained using traditional capillary tube and steam gauge is no longer required by the ground crew because such compensation may no longer be needed due to the type of pressure transducer(s) used, or alternatively, if necessary such temperature-based compensation or correction may be carried out automatically by controller 50 and automatically reflected in the information displayed in display area 16. Accordingly, controller 50 may be configured to receive both pressure and temperature information related to the oxygen system and carry out any correction or compensation if necessary based on data stored on or otherwise available to controller 50.

Controller 50 may comprise one or more data processors and one or more computer-readable memories storing machine-readable instructions executable by the data processor(s) and configured to cause controller 50 to perform a series of steps so as to implement a computer-implemented process such that instructions, when executed by such data processor(s) or other programmable apparatus, can cause the functions/acts described herein to be executed. Memory(ies) can comprise any storage means (e.g. devices) suitable for retrievably storing data (e.g., look-up table(s)) and machine-readable instructions executable by the data processor(s) of controller 50.

Various aspects of the present disclosure can be embodied as systems, devices, methods and/or computer program products. Accordingly, aspects of the present disclosure can take the form of an entirely hardware embodiment, an entirely software embodiment or an embodiment combining software and hardware aspects. Furthermore, aspects of the present disclosure can take the form of a computer program product embodied in one or more non-transitory computer readable medium(ia) having computer readable program code embodied thereon. The computer program product can, for example, be executed by controller 50 to cause the execution of one or more tasks disclosed herein.

In some embodiments, controller 50 may be operatively connected to network 51 to permit sharing of data with other devices onboard of aircraft 10. Network 51 may comprise one or more data buses onboard aircraft 10. For example, such interface with network 51 may permit common data to be shared and displayed on different servicing panels 12 of aircraft 10. Such interface with network 51 may permit controller 50 to receive data from and/or transfer data to other devices (e.g., other systems) onboard of aircraft 10 and control electronic display device 14 accordingly based on user input or otherwise.

Figure 5:
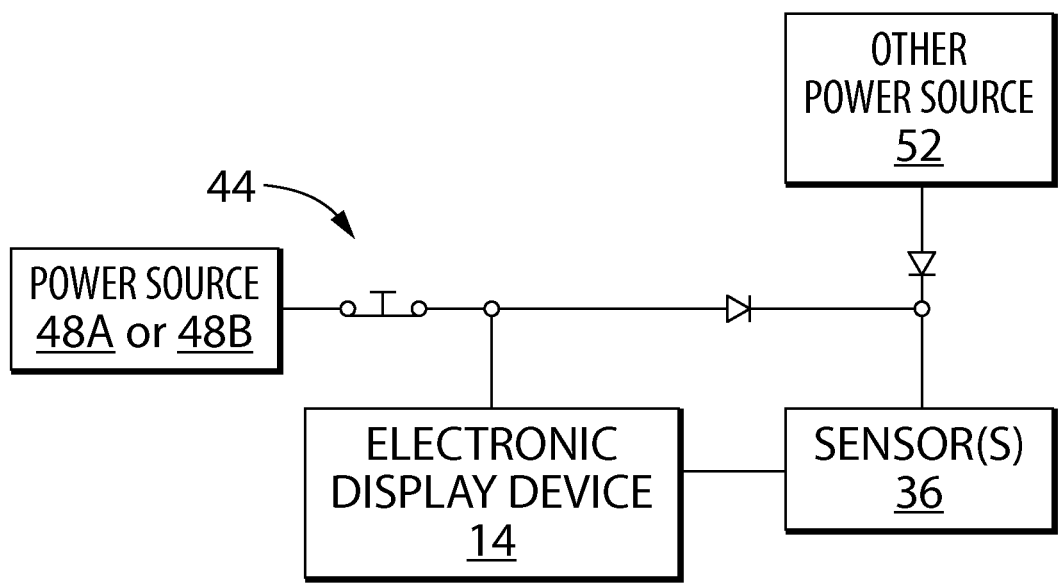
FIG. 5 is a schematic representation of an exemplary electric arrangement for the servicing panel.

FIG. 5 is a schematic representation of an exemplary electric arrangement for servicing panel 12. As explained above, switch 44 may be operatively disposed between electric power source 48A or 48B and electronic display device 14 so that electric power may be supplied to electronic display device 14 only as needed when servicing panel 12 is accessed by opening door 40 for example. Switch 44 may also be operatively disposed between power source 48A or 48B and sensor(s) 36 to permit the activation of electronic display device 14 and the interrogation of sensor(s) 36 on an as-needed basis using the same power source 48A or 48B when servicing panel 12 is accessed. Alternatively, when aircraft 10 is powered and another power source 52 such as a (e.g., direct-current) electrical bus of aircraft 10 is available for example, sensor(s) 36 may receive power from such other power source 52. It is understood that sensor(s) 36 may not necessarily be exclusively for use with electronic display device 14 but may be used for reporting the status of various systems to the flight deck of aircraft 10 for example.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A servicing panel of an aircraft, the servicing panel comprising:
    an electronic display device having a display area viewable from an exterior of the aircraft, the electronic display device being operatively connected to display information relating to a system of the aircraft on the display area;
    a servicing port associated with the system, the servicing port comprising an electric connector connectable to a power source external to the aircraft for powering the electronic display device, the servicing panel comprising said electric connector being accessible from the exterior of the aircraft; and
    a switch actuatable by movement of a door, the switch causing activation of the electronic display device when the door is open and deactivation of the electronic display device when the door is closed,
    wherein the switch is operatively disposed between the electric connector and a sensor of the system of the aircraft, and when the door is open, the switch is configured to connect the electric connector with the sensor as to permit interrogation of the sensor using electricity from the power source external to the aircraft when the aircraft is powered down on an as-needed basis.

2. The servicing panel as defined in claim 1, comprising one or more user input devices associated with the electronic display device and accessible from the exterior of the aircraft.

3. The servicing panel as defined in claim 2, wherein the one or more user input devices comprise a tactile button.

4. The servicing panel as defined in claim 2, wherein the one or more user input devices comprise a touch-sensitive region of the display area.

5. The servicing panel as defined in claim 2, wherein the one or more user input devices comprise a touch-sensitive region of the display area and a tactile button.

6. The servicing panel as defined in claim 2, wherein the one or more user input devices are configured to selectively cause a change in the information displayed in the display area based on user input.

7. The servicing panel as defined in claim 1, comprising the door, wherein the door is movable between a closed position covering the display area of the electronic display device and an open position where the display area is uncovered.

8. The servicing panel as defined in claim 1, wherein:
the switch is operatively disposed between an onboard power source and the electronic display device.

9. The servicing panel as defined in claim 1, wherein the system comprises an oxygen tank.

10. The servicing panel as defined in claim 9, wherein the electronic display device is operatively connected to receive a signal indicative of a pressure inside the oxygen tank via an electric connection.

11. The servicing panel as defined in claim 1, wherein the electronic display device is operatively and wirelessly connected to the system of the aircraft.

12. The servicing panel as defined in claim 1, comprising a headphone jack.

13. The servicing panel as defined in claim 1, wherein the electronic display device is operatively connected to display information relating to a plurality of systems of the aircraft on the display area.

14. An aircraft comprising the servicing panel as defined in claim 1.

15. A servicing panel of an aircraft accessible from an exterior of the aircraft, the servicing panel comprising:

an electronic display device having a display area viewable from the exterior of the aircraft, the electronic display device being operatively connected to display information relating to a system of the aircraft on the display area;

a servicing port associated with the system, the servicing port comprising an electric connector connectable to a power source external to the aircraft for powering the electronic display device, the servicing panel comprising said electric connector being accessible from the exterior of the aircraft;

a door movable between a closed position covering the display area of the electronic display device and an open position where the display area is uncovered; and a switch actuatable by movement of the door, the switch causing activation of the electronic display device when the door is open and deactivation of the electronic display device when the door is closed, wherein the switch is operatively disposed between the electric connector and a sensor of the system of the aircraft, and when the door is open, the switch is configured to connect the electric connector with the sensor as to permit interrogation of the sensor using the power source external to the aircraft when the aircraft is powered down on an as-needed basis.

* * * * *